United States Patent
Liedtke

(10) Patent No.: US 6,460,730 B1
(45) Date of Patent: Oct. 8, 2002

(54) METHOD AND DEVICE FOR DISPENSING A FLUID FROM A PRESSURE TANK

(75) Inventor: Bjorn Liedtke, Oberderingen (DE)

(73) Assignee: STEAG Hamatech (DE)

( * ) Notice: Subject to any disclaimer, the term of this patent is extended or adjusted under 35 U.S.C. 154(b) by 0 days.

(21) Appl. No.: 09/958,067

(22) PCT Filed: Mar. 11, 2000

(86) PCT No.: PCT/EP00/02155

§ 371 (c)(1),
(2), (4) Date: Sep. 28, 2001

(87) PCT Pub. No.: WO00/58018

PCT Pub. Date: Oct. 5, 2000

(30) Foreign Application Priority Data

Mar. 29, 1999 (DE) .......................................... 199 14 203
Aug. 9, 1999 (DE) .......................................... 199 37 606

(51) Int. Cl.$^7$ ................................................ G01F 11/00
(52) U.S. Cl. ................................ 222/1; 222/55; 222/61; 222/189.06; 222/399
(58) Field of Search .............................. 222/1, 55, 61, 222/189.06, 394, 399

(56) References Cited

U.S. PATENT DOCUMENTS

| | | | |
|---|---|---|---|
| 2,751,114 A | 6/1956 | Greaves ........................ | 222/70 |
| 4,313,475 A | 2/1982 | Wiggins ....................... | 141/18 |
| 4,413,752 A | 11/1983 | McMillin et al. ............. | 222/56 |
| 4,440,314 A * | 4/1984 | Vetter et al. ................. | 222/39 |
| 4,450,981 A | 5/1984 | Haig ............................ | 222/61 |
| 4,613,059 A * | 9/1986 | Merkel ........................ | 222/52 |
| 5,148,945 A * | 9/1992 | Geatz ............................ | 222/1 |
| 5,568,882 A * | 10/1996 | Takacs ......................... | 222/61 |
| 5,730,323 A | 3/1998 | Osborne ....................... | 222/55 |
| 6,094,142 A * | 7/2000 | Lu ............................... | 222/55 |
| 6,123,839 A * | 9/2000 | Sussman ................. | 222/189.06 |
| 6,161,723 A * | 12/2000 | Cline et al. ................... | 222/55 |

FOREIGN PATENT DOCUMENTS

| | | |
|---|---|---|
| DE | 4215841 A1 | 11/1993 |
| WO | WO 97/14505 | 4/1997 |

OTHER PUBLICATIONS

MERZ, 1966 Grundkurs der Regelungstechni Sec 2.42.2. Brauwelt—vol. 14 Apr. 2, 1981.

* cited by examiner

Primary Examiner—Joseph A. Kaufman
(74) Attorney, Agent, or Firm—R.W. Becker & Assoc.; R. W. Becker

(57) ABSTRACT

To insure in a simple and economical manner a uniform and continuous dispensing of a fluid from a pressure tank, a method is provided according to which a pressurized gas is introduced into the pressure tank via a proportional valve that is disposed in an inlet line of the pressure tank, the pressure of the fluid located in an outlet line is measured with a first pressure sensor, and an outlet valve in the outlet line is opened and closed. The method also includes the determination of a set pressure value as a function of the measurement result of the first pressure sensor, the transfer thereof to the proportional valve, the measurement of the gas pressure in the inlet line with a second pressure sensor disposed between the proportional valve of the pressure tank, and the transfer of the measurement result to the proportional valve. The invention also provides an apparatus for carrying out the above method.

16 Claims, 4 Drawing Sheets

METHOD AND DEVICE FOR DISPENSING A FLUID FROM A PRESSURE TANK

BACKGROUND OF THE INVENTION

The present invention relates to a method for dispensing a fluid from a pressure tank, whereby the introduction of a pressurized gas into the pressure tank is provided via a proportional valve that is disposed in an inlet line of the pressure tank, the measuring of the pressure of the fluid located in the outlet line is provided by a first pressure sensor, and the opening and closing of an outlet valve in the outlet line is provided for. The invention further relates to an apparatus for dispensing a fluid from a pressure tank, and includes a proportional valve that is disposed in an inlet line of the pressure tank for introducing a pressurized gas, a first pressure sensor in an outlet line of the pressure tank for measuring the pressure of the fluid located in the outlet line, and an outlet valve in the outlet line.

Such methods and apparatus are known, for example, in coating systems for the manufacture of CDs. With these systems, it is important for a uniform and continuous coating of the CDs that the pressure of the lacquer provided at the outlet or dispense valve preferably has a constant predetermined value. With the known systems, the pressure value measured at the first pressure sensor is utilized as an actual value for an adjustment of the proportional valve. However, this results in the problem that the pressure measured at the first sensor drops due to dynamic line and filter pressure losses as soon as the outlet valve is opened. Due to this drop in pressure, the pressure at the proportional valve is readjusted until the actual value again coincides with the prescribed desired value. In this connection, readjustment also takes place during a dispensing process, which leads to imprecision with regard to the applied quantity of lacquer. After the closing of the outlet valve, the dynamic line and filter pressure losses no longer have any effect, and the measured pressure at the first pressure sensor again rises to an increased value. The proportional valve must again be readjusted since the previously introduced gas, which is generally nitrogen, is vented; the readjustment takes place until the actual value again corresponds to the desired value.

These control or adjustment processes lead to fluctuations of the dosing volume as well as to a high consumption of nitrogen. Furthermore, concentration changes and possibly a crystallization of the lacquer dissolved in the solvent can result due to solvent evaporation and a discharge of the solvent vapor together with the nitrogen that escapes during the readjustment. In addition, continuous oscillations of the regulator occur during a tank filling state with critical residence gas volumes, which leads to a greater consumption of nitrogen.

It is therefore an object of the present invention to provide a method and apparatus for dispensing a fluid from a pressure tank, according to which a uniform and continuous dispensing of the fluid is ensured in a simple and economical manner.

SUMMARY OF THE INVENTION

The stated object is inventively realized with a method of the aforementioned type in that a desired or set pressure value is determined as a function of the measurement result of the first pressure sensor and is transferred to the proportional valve, and the gas pressure in the inlet line is measured with a second pressure sensor disposed between the proportional valve and the pressure tank and is transferred to the proportional valve. By the measurement of the gas pressure in the inlet line, and the transfer of the measurement results to the proportional valve, the frequent readjustment of the proportional valve described above during opening and closing of the outlet valve is avoided, since no dynamic line and filter pressure losses occur between the proportional valve and the second pressure sensor. This leads to a low consumption of nitrogen since no discharge of nitrogen occurs during closing of the outlet valve, as a result of which also a lower change of the dye concentration in the solvent is achieved. Furthermore, continuous oscillations during the regulation process are suppressed, since the control loop formed by the proportional valve in the second pressure sensor is not oscillatory. As a consequence of the determination of a set pressure value as a function of the measurement result of the first pressure sensor, and transfer of this value to the proportional valve, there is effected an automatic adaptation of the system to changeable disturbance variables, such as tank filling state and filter pressure losses, as a result of which a stable regulating condition is achieved without oscillations and a high dosing precision is also achieved.

Pursuant to one preferred specific embodiment of the invention, for the determination of the set pressure value only those measurement results of the first pressure sensor are used that were measured with the outlet valve opened in order to prevent pressure changes, which occur when the outlet valve is opened or closed, from influencing the determination of the desired or set value. For a constant dosing volume flow, only the pressure at the external sensor with the valve opened is relevant and of interest. In this connection, only those measurement results of the first pressure sensor are used that were measured after a specific period of time after the opening of the outlet valve in order that oscillations that occur during the opening will have no influence upon the determination. In order to achieve a uniform dispensing of the fluid, for the determination of the set pressure value a measurement result of the first pressure sensor determined over a measurement interval is used.

The set pressure value, in addition to being determined as a function of the measurement result of the first pressure sensor, is preferably determined as a function of the measurement result of the second pressure sensor in order to achieve a better uniformity and suppression of disturbance variables. A pressure difference between the inlet and outlet line is preferably measured, whereby in one specific embodiment of the invention, the set pressure value is determined as a function of the measured pressure differential.

Pursuant to a particularly preferred specific embodiment of the invention, the determination and/or transfer of the set pressure value is carried out only when the outlet valve is closed to order to ensure that during a dispensing process no change of the prescribed set pressure value, and a readjustment possibly connected therewith, occur.

Pursuant to a further specific embodiment of the invention, the filling state height of the pressure tank is determined as a function of the measurement results of the first and second pressure sensors in order to provide an automatic indication thereof and to be able to correct the thereby resulting disturbance variables during the determination of the set pressure value.

For an automatic indication of a filter state, the state of a filter located in the outlet line is preferably determined as a function of the measurement results of the first pressure sensor. From the automatic indication it can be determined when a filter change is necessary. In this connection, the filter state is preferably determined as a function of a difference of the measurement results of the first pressure sensor with the outlet valve closed and opened. During the determination of the filter state, preferably only those measurement results are used that were measured after conclusion of a predetermined period of time after the closing or after the opening of the outlet valve in order that oscillations that result during the closing or opening do not have an influence upon the determination.

The object of the present invention is realized with an apparatus of the aforementioned type in that a control unit is provided for the determination, as a function of the measurement result of the first pressure sensor, of a set pressure value that is to be provided to the proportional valve, and a second pressure sensor is provided between the proportional valve and the pressure tank for measuring the gas pressure in the inlet line and for transferring the measurement result to the proportional valve. With such an apparatus, the advantages described above in reference to the method are achieved. For a particularly simple and economical embodiment of the invention, the second pressure sensor is preferably integrated in the proportional valve.

Pursuant to a further advantageous specific embodiment of the invention, a differential pressure sensor is provided and is disposed between the inlet and the outlet line.

BRIEF DESCRIPTION OF THE DRAWING

The invention will be subsequently explained with the aid of one preferred specific embodiment with reference to the drawings; in the drawings.

DESCRIPTION OF PREFERRED EMBODIMENTS

Figure 1:
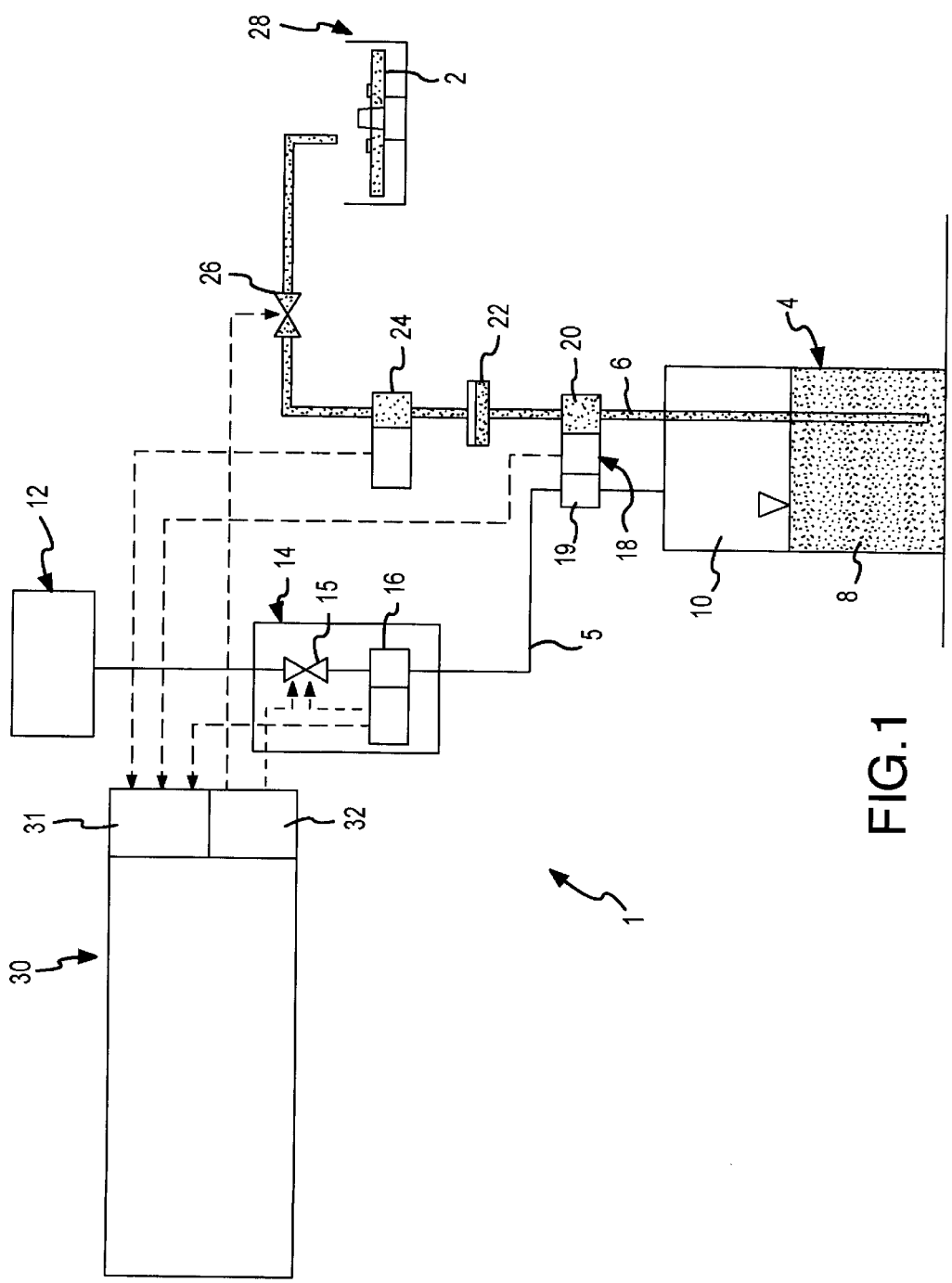
FIG. 1 shows an inventive apparatus for dispensing a fluid.

FIG. 1 shows a coating system 1 for CDs 2.

The coating system 1 has a pressure tank 4 with an inlet line 5 and an outlet line 6. The inlet line 5 is connected to an upper side of the pressure tank and communicates with an upper region of the pressure tank 4. The outlet line 6 is similarly connected to an upper side of the pressure tank 4. However, the outlet line 6 extends through the interior of the pressure tank 4 and communicates with the interior of the pressure tank in a lower region thereof. The pressure tank 4 is partially filled with a lacquer 8 for coating the CDs 2. Due to the weight of the lacquer 8, it;completely fills a lower portion of the pressure tank 4. Disposed in the region located above the lacquer is a pressurized gas 10, such as nitrogen.

The nitrogen 10 is fed into the pressure tank 4 from a nitrogen supply 12 that is connected to the inlet line 5. Disposed in the inlet line 5 between the nitrogen supply 12 and the pressure tank 4 is a valve unit 14 having a proportional valve 15 and an internal pressure sensor 16 that is disposed between the proportional valve 15 and the pressure tank 4.

Provided adjacent to the upper side of the pressure tank 4 is a differential pressure sensor 18 having a first sensor element 19 that is disposed in the inlet line 5, and a second sensor element 20 that is disposed in the outlet line 6. Above the sensor element 20, in the outlet line 6, are furthermore disposed a filter 22, a pressure sensor 24, as well as an outlet valve 26. Downstream of the valve 26 (viewed from the pressure tank 4) the outlet line 6 opens to a coating station 28 in which CDs 2 are supplied with the lacquer 8 when the valve 26 is opened.

The valve unit 14, the differential pressure sensor 18, the pressure sensor 24, as well as the valve 26 are respectively connected to a control unit 30. The control unit 30 is provided with an input portion 31 that receives the measurement results of the internal pressure sensor 16, of the differential pressure sensor 18, and of the pressure sensor 24. An output portion 32 of the control unit 30 is connected to the valve 26 in order to control the opening and closing of the valve 26. The output portion 32 is furthermore connected to the proportional valve 15 of the valve unit 14 in order to prescribe for the proportional valve 15 a set pressure value calculated by the control unit 30. An output of the internal pressure sensor 16 is also connected to the proportional valve 15 in order to provide an actual pressure value to the proportional valve 15 in the inlet line 5. The proportional valve 15 of the valve unit 14 is in the position, due to the prescribed set pressure value from the control unit 30, as well as the actual pressure value from the internal pressure sensor 16, to adjust the pressure in the inlet line 5 to the set pressure valve. Thus, a control loop is formed within the valve unit 14 into which a set pressure value is externally introduced by the control unit 30.

During operation of the coating system 1, the pressure tank 4 is brought to a prescribed pressure level by introducing the pressurized nitrogen. Due to the pressure that exists in the pressure tank, the lacquer 8 that is in the pressure tank is pressed upwardly in the outlet line 6 in the direction of the valve 26. When the valve 26 is closed, the system is essentially static, and no flow of lacquer takes place. If a CD 2 is disposed in a coating position in the coating station 28, the valve 26, as controlled by the control unit 30, is opened for a specific period of time that is necessary for applying a coat of lacquer on the substrate 2. With the valve 26 opened, due to the pressure that exists in the pressure tank 4, lacquer 8 flows through the outlet line 6 to the coating station 28. After the valve 26 is closed, a static systems again results in which no lacquer flows.

So that in successive coating steps a uniform quantity of lacquer is applied to the substrate 2, the pressure in the system, especially in the vicinity of the outlet 26, must be kept at a constant value when the outlet valve 26 is opened. This is achieved by keeping the pressure in the outlet line 6, especially in a region downstream of the filter 22 (seen from the pressure tank 4) at a constant level. For this purpose, a set pressure value is prescribed for the valve unit 14 for regulating the pressure in the system, which set pressure value is related to the pressure measured by the pressure sensor 24.

Figure 2:
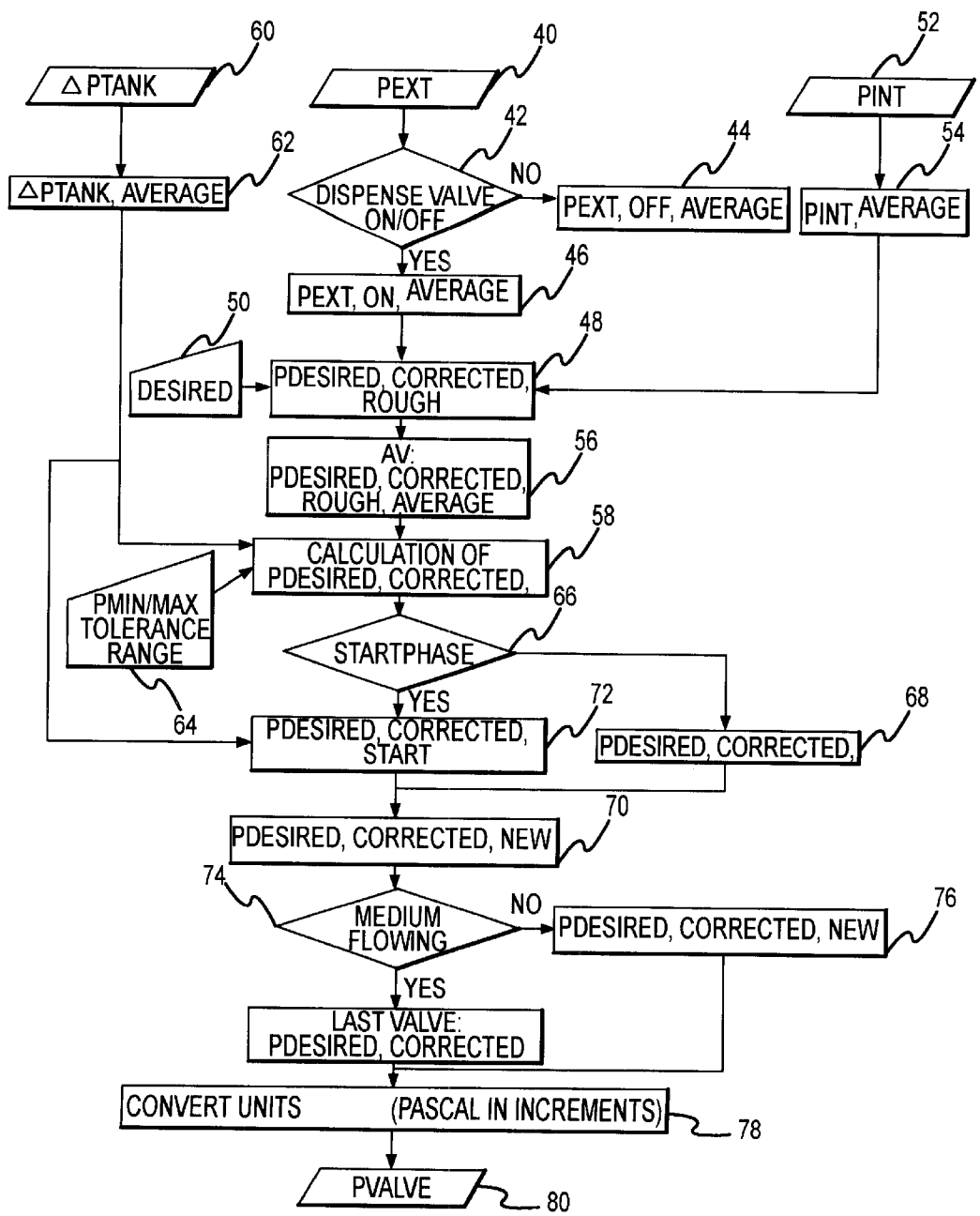
FIG. 2 is a flow diagram that illustrates the automatic determination of a set pressure value.

The calculation of the set pressure value will be explained subsequently with the aid of the flow diagram of FIG. 2.

In a first block 40, the pressure $P_{ext}$ is measured at the first pressure sensor 24. This measured value is conveyed further to a decision block 42 that establishes whether the measured values are derived from a period of time in which the outlet valve 26 is opened or closed.

If the measurement results are derived from a period of time in which the outlet valve 26 is closed, then the measurement results are conveyed further to a block 44, which from the measurement results calculates an average pressure value $P_{ext,\ OFF,\ average}$.

If the measurement results are derived from a period of time in which the valve 26 is opened, the measurement results are conveyed further to a block 46 that calculates an average pressure value $P_{ext, ON, average}$.

After the calculation of the average pressure value $P_{ext, ON average}$, this value is conveyed further to a block 48. In the block 50, as a function of the desired volume stream of the lacquer to the coating station, a desired pressure value $P_{desired}$ is prescribed. This pressure value $P_{desired}$ is conveyed further to the block 48.

In a block 52, a pressure $P_{int}$ is measured at the pressure sensor 16 of the valve unit 14. The measurement results are conveyed further to a block 54, in which an average pressure value $P_{int, average}$ is calculated therefrom. This average pressure value is conveyed further to the block 48.

In the block 48, a roughly approximated or corrected set pressure value $P_{desired, corrected, rough}$ is calculated as a function of the pressure values introduced in the block 48. The roughly approximated set pressure value results from the following equation:

$$P_{desired, corrected, rough} = P_{desired} + (P_{int, average} - P_{ext, average})$$

This value is conveyed further to a block 56, in which an average value $P_{desired, corrected, rough, average}$ is calculated, which in turn is conveyed further to a block 58.

In a block 60, the pressure differential $\Delta P_{tank}$ between the inlet line and the outlet line is measured and is conveyed further to a block 62, where the measurement results are averaged. The measured pressure differential $\Delta P_{tank}$ is related to the fill height of the lacquer 8 in the pressure tank 4, which is calculated therefrom. The averaged pressure differential $\Delta P_{tank, average}$ is transferred the block 58. In a block 64, a tolerance range $\Delta P_{tolerance}$ for successive measurements is determined and transferred to the block 58.

In the block 58 it is determined whether the last roughly approximated, averaged set pressure value $P_{desired, corrected, rough, average}$ obtained in the block 56 relative to a previously obtained value lies within the tolerance range. This is determined as follows:

$$((P_{desired, corrected, rough, average, j+1} - P_{desired, corrected, rough, average, j})^2)^{0.5} > \Delta P_{tolerance};$$

where j+1 indicates the last calculated average, and j indicates the previously calculated average value.

When the above relationship is fulfilled, then the following applies $$P_{desired, corrected, j+1} + P_{desired, corrected, rough, average, j+1}$$

i.e. the newly approximated set pressure value corresponds to the average value determined in Block 56.

If the above relationship is not fulfilled, then the newly approximated set pressure value is determined with the aid of the following equation:

$$P_{desired, corrected, j+1} = P_{desired, corrected, j} + (\Delta P_{tank, average, j+1} - \Delta P_{tank, average, j}).$$

The regulation or adjustment with the aid of the measurement results of the differential pressure sensor 18 is effected on the basis of a greater measurement precision of the differential pressure sensor 18 relative to the pressure sensor 24, as a result of which the frequency of "rough" readjustment procedures and in particular the amplitude of the readjustment changes are reduced. Consequently, less nitrogen is used.

The new, approximated set pressure value $P_{desired, corrected}$ that results from the determination in the Block 58 is subsequently conveyed further to the Block 66. In the Block 66, it is established whether the coating system is within a start phase, i.e. for example within the first five coating cycles. If the system is not within a start phase, then the set pressure value determined in the Block 58 is conveyed via the Block 68 to a Block 70 in order there to form the new, approximated set pressure value $P_{desired, corrected, new}$.

However, if the system is within a start phase, in a Block 72 an adapted or an approximated start set pressure value $P_{desired, corrected, start}$ is determined, among others, with the aid of the characteristics of the lacquer, the geometrical relationships of the system, the pressure difference at the differential pressure sensor, and the volume flow of the lacquer.

$V_{start}$ can be determined on the basis of the geometrical relationships, the pressure relationships in the outlet line, as well as the characteristics of the lacquer, whereby due to the lack of measurement results one proceeds on the basis that the pressure at the pressure sensor is $P_{ext} = P_{desired}$. If the filter is new, the filter constant $K_{filter, start}$ corresponds to the manufacturing specifications. If the filter is used, it corresponds to the last determined and stored value. Alternatively, it is also possible to determine the filter constant in that prior to the actual coating of a CD, a test output cycle is carried out in which the filter constant is then determined.

This start value determination is necessary since when the system is initiated $P_{ext, ON}$ is not known. The set value correction provides a roughly approximated start value.

The approximated start set pressure value is subsequently conveyed further to the Block 70, where it forms the new, approximated set pressure value $P_{desired, corrected, new}$.

This value is conveyed further to the Block 74, in which it is determined whether the system is presently in a static or dynamic state. If the system is in a static state, i.e. if no medium flows, then the new, approximated set pressure value $P_{desired, corrected, new}$ is transferred via a Block 76 to a Block 78. If it is determined in the Block 74 that the system is in a dynamic state, i.e. a medium flows, then the new, approximated set pressure value $P_{desired, corrected, new}$ is not conveyed further to the Block 78, but rather the previous value found in the Block 78 is retained.

In the Block 78, the approximated set pressure value $P_{desired, corrected, new}$ is converted into units utilizable for the proportional valve 15 and, for presetting a set pressure value, is transmitted to the valve as $P_{valve}$ in the Block 80.

Figure 3:
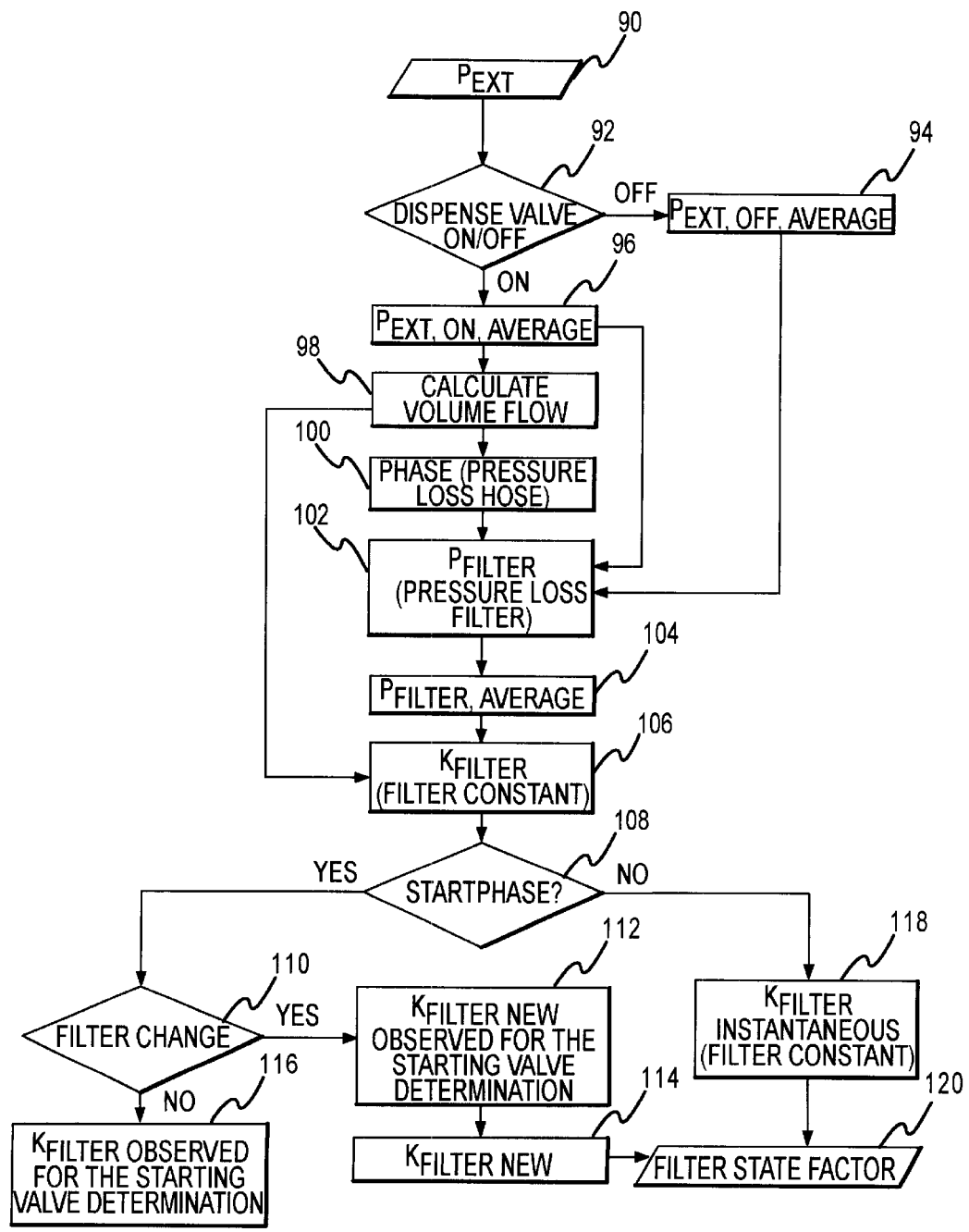
FIG. 3 is a flow diagram that illustrates the determination of a filter state and a volume flow.

The determination of the filter state will be explained subsequently with the aid of the flow diagram of FIG. 3.

To determine the filter state, the pressure $P_{ext}$ must also be evaluated with the outlet or dispense valve 26 closed. The difference between the pressure $P_{ext, open}$ measured at the pressure sensor 24 with the outlet valve opened and $P_{ext, closed}$ with the outlet valve 26 closed resulted from the filter pressure loss and the line pressure loss in the conduit in conformity with the following equation:

$$P_{ext, closed} - P_{ext, opened} = \Delta P_{filter} + \Delta P_{conduit},$$

whereby with a constant tank pressure and volume flow the pressure loss in the conduit is also constant. However, over a longer period of time the filter pressure loss can increase, even at constant tank pressure, if the filter becomes clogged. Consequently, the approximated set pressure value $P_{desired, corrected, new}$ must be increased to the same extent.

If in so doing a threshold value is reached, an alarm message appears that indicates that the filter is used up and must be exchanged.

Furthermore, the filter state should be indicated during the operation. The calculation of the filter state will be described with the aid of the flow diagram of FIG. 3.

In a Block 90, the pressure $P_{ext}$ is measured in the outlet line 6 at the pressure sensor 24. The measured pressure values are conveyed further to a Block 92 in which it is determined whether the outlet or dispense valve 26 is opened or closed. If the outlet valve 26 is closed, the measured pressure values $P_{ext}$ are transferred to a Block 94 that calculates an average value of the measured pressure values with the valve 26 closed of $P_{ext, OFF, average}$.

If it is determined in Block 92 that the outlet valve 26 is opened, then the measured pressure values $P_{ext}$ are conveyed to a Block 96 that calculates an average value $P_{ext, ON, average}$ from the pressure values $P_{ext}$ measured with the valve open.

Subsequently, in a Block 98 the volume flow of the lacquer, and in Block 100 the pressure loss in the outlet line $\Delta P_{conduit}$ are determined. The average value $P_{ext, OFF, average}$, the average value $P_{ext, ON, average}$ as well as the pressure loss in the line $\Delta P_{conduit}$ are transferred to a Block 102 in which a pressure loss in the filter $\Delta P_{filter}$ is calculated. The pressure loss in the filter is determined with the aid of the following equation:

$$\Delta P_{filter} = \Delta P_{ext, OFF, average} - \Delta P_{ext, ON, average} - \Delta P_{conduit}.$$

Subsequently, in a Block 104; an average value $\Delta P_{filter, average}$ of the pressure loss at the filter is calculated.

Subsequently, in a Block 106, a filter constant $K_{filter}$ is calculated with the aid of the determined filter pressure loss and with the aid of the volume flow. This is done with the aid of the following equation:

$$K_{filter} = \Delta P_{filter, average} \cdot A_{filter} / (V \cdot \eta_{medium})$$

This value is transferred to a Block 108 in which is determined if the system is in a start phase.

If the system is in a start phase, then it is determined in a further decision Block 110 if previously a filter change took place or not. If a filter change took place prior to the new start, then in a Block 112 for the above calculation of the start set pressure value $P_{desired, corrected, start}$ the filter constant $K_{filter, start}$ is specified the same as the filter constants of a new filter $K_{filter, new}$. This value $K_{filter, new}$ is determined from the manufacturing specifications in the Block 114 and is transferred to the Block 112.

If it is established in the Block 110 that no filter change took place prior to the new start, then in a Block 116, for the starting value determination, the filter value constant $K_{filter, start}$ is specified the same as the last determined and stored, prior to the shutdown of the system, value $K_{filter, observed}$.

If it is determined in the Block 108 that the system is not in a start phase, the filter constant $K_{filter}$ calculated in the Block 106 is conveyed via a Block 118 to the Block 120 as an instantaneous filter state factor $K_{filter, instantaneous}$. In the Block 120, the filter state factor is calculated by the following equation:

Filter state factor=$K_{filter, instantaneous}/K_{filter, new}$.

The filter state factor indicates by how much the instantaneous filter pressure loss is greater than the original. In this way, it can be better estimated how long the old filter can still be used before a filter change is necessary.

Figure 4:
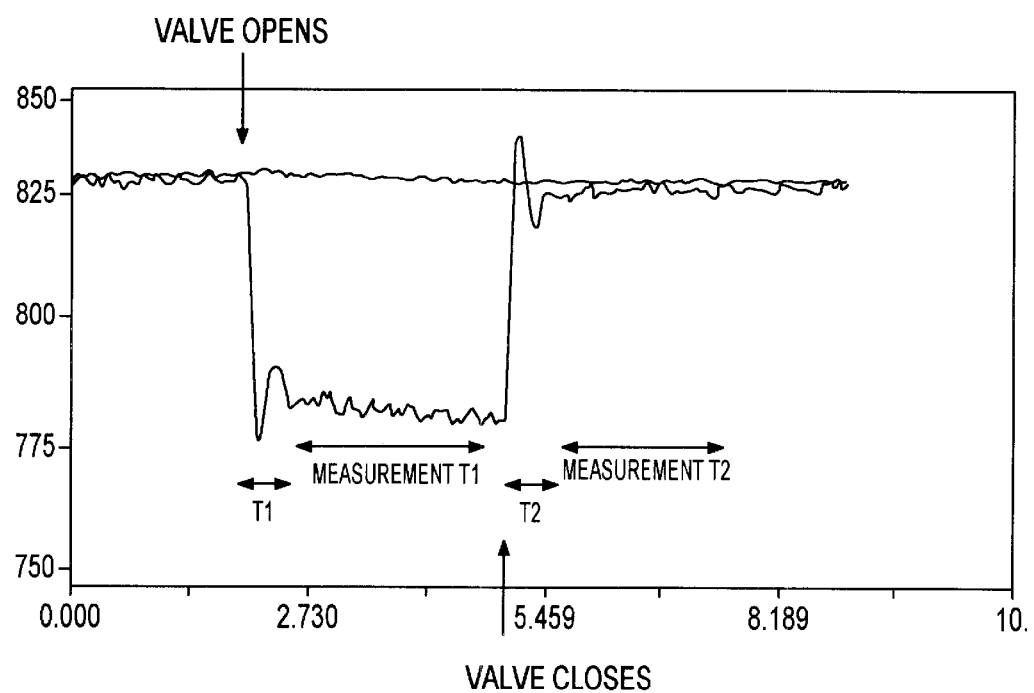
FIG. 4 is a graph showing dead and measurement times of pressure sensors.

FIG. 4 shows the pressures measured at the internal pressure sensor 16 and at the pressure sensor 24 over an opening cycle of the valve 26. The upper curve shows the pressures measured at the internal pressure sensor 16, while the lower curve, which varies relatively significantly, shows the pressures measured at the pressure sensor 24.

As can be seen from FIG. 4, the pressures measured at the internal pressure sensor 16 are independent of whether the outlet valve 26 is closed or opened, and are relatively constant.

However, the pressures measured at the pressure sensor 24 vary relatively significantly during opening or closing of the outlet valve 26. In this connection, directly after the closing there results a relatively significant drop in pressure, which subsequently again increases in order to then again drop. Thus, in a time interval T1 after the opening of the outlet valve 26 relatively significant fluctuations of the pressure result. After the time interval T1, there is a phase having a relatively constant pressure. After the closing of the outlet valve 26, there is a relatively significant increase in pressure, which subsequently again drops and rises. Thus, in a time interval T2 after the closing of the valve relatively significant fluctuations result. After the time interval T2, there is again a phase having a relatively constant pressure.

For the above calculation of a corrected set pressure value, as well as for the calculation of the filter state factor, therefore exclusively measurement results are used that originate from a phase in which the pressure fluctuations resulting from the opening and closing of the valve have essentially subsided. These phases are indicated in FIG. 4 as measurement T1 for measurements with the valve opened, and measurement T2 for measurements with the valve closed.

Although the apparatus has been described with the aid of a preferred specific embodiment assuming a coating system for CDs, the apparatus is not limited thereto.

The specification incorporates by reference the disclosure of German priority document 199 14 203.3 filed Mar. 29, 1999, German priority document 199 37 606.9 filed Aug. 9, 1999 and International priority document PCT/EP00/02155 of Mar. 11, 2000.

The present invention is, of course, in no way restricted to the specific disclosure of the specification and drawings, but also encompasses any modifications within the scope of the appended claims.

What is claimed is:

1. A Method of dispensing a fluid from a pressure tank, including the steps of:
   introducing a pressurized gas into said pressure tank via a proportional valve that is disposed in an inlet line of said pressure tank;
   measuring the pressure of fluid in an outlet line of said pressure tank via a first pressure sensor;
   determining a set pressure value as a function of a measurement result of said first pressure sensor;
   transferring said set pressure value to said proportional valve;
   measuring a gas pressure in said inlet line via a second pressure sensor that is disposed between said proportional valve and said pressure tank, and transferring a resulting measurement result to said proportional valve; and opening and closing an outlet valve in said outlet line.

2. A method according to claim 1, wherein said determination of said set pressure value, only those measurement results of said first pressure sensor are used that were measured when said outlet valve was open.

3. A method according to claim 2, wherein only those measurement results of said first pressure sensor were used that were measured after a specific period of time after opening of the outlet valve.

4. A method according to claim 1, wherein said determination of said set pressure value, a measurement result of said first pressure sensor determined over a measurement interval is used.

5. A method according to claim 1, wherein said set pressure value is also determined as a function of a measurement result of said second pressure sensor.

6. A method according to claim 1, wherein a pressure differential is measured between said inlet line and said outlet line.

7. A method according to claim 6, wherein said set pressure value is also determined as a function of said pressure differential.

8. A method according to claim 1, wherein a filling state height of said pressure tank is determined as a function of measurement results of a differential pressure sensor.

9. A method according to claim 1, wherein at least one of said determination and transfer of said set pressure value is effected only when said outlet valve is closed.

10. A method according to claim 1, wherein a filling state height of said pressure tank is determined as a function of measurement results of said first and second pressure sensors.

11. A method according to claim 1, wherein a state of a filter disposed in said outlet line is determined as a function of measurement results of said first pressure sensor.

12. A method according to claim 11, wherein said filter state is determined as a function of a difference of the measurement results with the outlet valve closed and with the outlet valve opened.

13. A method according to claim 11, wherein during said determination of said filter state, only those measurement results are used that were measured after the conclusion of a predetermined period of time after closing or opening of said outlet valve.

14. An apparatus for dispensing a fluid from a pressure tank, comprising:

a proportional valve that is disposed in an inlet line of said pressure tank and serves for introducing a pressurized gas into said pressure tank;

a first pressure sensor disposed in an outlet line of said pressure tank for measuring the pressure of fluid located in said outlet line;

an outlet valve in said outlet line;

a control unit for determining, as a function of a measurement result of said first pressure sensor, a set pressure value that is to be provided said proportional valve; and a second pressure sensor, disposed between said proportional valve and said pressure tank, for measuring a gas pressure in said inlet line and for transferring a resulting measurement result to said proportional valve.

15. An apparatus according to claim 14, wherein said second pressure sensor is integrated in said proportional valve.

16. An apparatus according to claim 14, wherein a differential pressure sensor is disposed between said inlet line and said outlet line.

* * * * *

UNITED STATES PATENT AND TRADEMARK OFFICE
CERTIFICATE OF CORRECTION

PATENT NO.    : 6,460,730 B1
DATED         : October 8, 2002
INVENTOR(S)   : Liedtke It is certified that error appears in the above-identified patent and that said Letters Patent is hereby corrected as shown below:

Title page,
Item [73], should read as follows:
-- [73]  Assignee:  STEAG HamaTech AG --

Signed and Sealed this

Twenty-first Day of January, 2003

JAMES E. ROGAN
*Director of the United States Patent and Trademark Office*